US007809405B1

United States Patent
Rand et al.

(10) Patent No.: US 7,809,405 B1
(45) Date of Patent: Oct. 5, 2010

(54) SYSTEM AND METHOD FOR REDUCING AVIATION VOICE COMMUNICATION CONFUSION

(75) Inventors: Timothy W. Rand, Hiawatha, IA (US); Sethu R. Rathinam, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 894 days.

(21) Appl. No.: 11/700,529

(22) Filed: Jan. 31, 2007

(51) Int. Cl.
*H04B 1/38* (2006.01)

(52) U.S. Cl. .................................. 455/563; 455/431
(58) Field of Classification Search .............. 455/563, 455/431
See application file for complete search history.

(56) References Cited

U.S. PATENT DOCUMENTS

| 7,330,147 | B2 * | 2/2008 | Khatwa ................... 342/29 |
| 2004/0263381 | A1 * | 12/2004 | Mitchell et al. ........... 342/42 |
| 2007/0241936 | A1 * | 10/2007 | Arthur et al. ............ 340/958 |
| 2007/0288128 | A1 * | 12/2007 | Komer et al. ............. 701/3 |
| 2008/0154441 | A1 * | 6/2008 | Harrison et al. .......... 701/3 |

* cited by examiner

Primary Examiner—Barry W Taylor
(74) Attorney, Agent, or Firm—Matthews J. Evans; Daniel M. Barbieri (57) ABSTRACT

The present invention is a method for reducing aviation voice communication confusion. The method includes receiving a first voice radio communication in a processing system. The method further includes receiving a second voice radio communication in the processing system. The method further includes comparing the first voice radio communication to the second voice radio communication. The method further includes providing an alert when the compared first voice radio communication and second voice radio communication are at least substantially inconsistent in content. The processing system implements speech recognition functionality when comparing the first voice radio communication to the second voice radio communication.

20 Claims, 4 Drawing Sheets

SYSTEM AND METHOD FOR REDUCING AVIATION VOICE COMMUNICATION CONFUSION

FIELD OF THE INVENTION

The present invention relates to the field of situational awareness and particularly to a system and method for reducing aviation voice communication confusion.

BACKGROUND OF THE INVENTION

Voice communication via radio is the primary means of communication between air traffic controllers and flight crews. Further, voice communication via radio may also be used by flight crews for receiving Automatic Terminal Information Service (ATIS) data. Still further, voice communication via radio may also be used by flight crews for communicating with Airline Operations Centers (AOC's), Fixed Base Operators (FBO's), Flight Service Stations (FSS's) and flight crews from other aircraft. Traditionally, some safeguards have been implemented by the above-referenced parties during such communications for ensuring that the communications have been received and understood by the intended recipient. For example, at initial voice radio contact between a pilot of a flight crew and an air traffic controller, a pilot may annunciate the full flight ID of his/her aircraft to the controller, while the controller annunciates his/her full Air Traffic Control (ATC) ID to the pilot. During subsequent communications, the pilot may have the option of: a) continuing to communicate the full flight ID; or b) communicating an abbreviated version thereof. Finally, when a clearance is given by the controller, the pilot may acknowledge the clearance with a full readback (including annunciating the full flight ID of his aircraft and verifying or dictating the exact instructions that were heard by the pilot) to assure the controller that the clearance instructions were received and correctly understood by the pilot of the aircraft for which said instructions were intended.

However, the above-referenced safeguards may often be ignored or loosely followed, which can lead to mistakes caused by human error, such as not listening closely enough to radio instructions, not providing enough information (such as using an abbreviated flight ID) or failing to clearly annunciate information. For instance, a flight ID, which is generally used by air traffic controllers for allowing the controller to direct voice radio communication instructions to a specific aircraft associated with the flight ID, may often "sound" similar to another flight ID associated with a second aircraft when not clearly annunciated. If the aircraft having "close sounding" flight IDs are located in substantially proximal airspace, this may hinder the controller's ability to safely coordinate activities of aircraft located within that airspace. Additionally, communication errors may also occur when a radio channel being utilized for voice radio communications experiences interference or blocking, which can result in communications being dropped, distorted, or the like. Such interference/blocking may result, for instance, in a pilot hearing only a portion of a communication sent from a controller, not hearing any of the communication, or not being able to understand the communication sent from the controller.

A number of additional factors may increase the likelihood of the occurrence of aviation voice communication confusion, such as: workload-related fatigue/stress on the pilot or controller; frequency congestion (which may promote 2 or more matching or like-sounding flight IDs/callsigns being on the same channel); controllers getting flights confused when working more than one frequency; pilots becoming distracted from concentrating on radio transmissions to and from the controller, etc. The above-referenced communication errors may result in confusion, delays, potential loss of separation of aircraft, or incidents/accidents involving aircraft.

Thus, it would be desirable to provide a system and method for reducing aviation voice communication confusion which addresses the problems associated with current solutions.

SUMMARY OF THE INVENTION

Accordingly, an embodiment of the present invention is directed to a method for reducing aviation voice communication confusion, including: receiving a first voice radio communication in a processing system; receiving a second voice radio communication in the processing system; comparing the first voice radio communication to the second voice radio communication; and providing an alert when the compared first voice radio communication and second voice radio communication are at least substantially inconsistent in content, wherein the processing system implements speech recognition functionality when comparing the first voice radio communication to the second voice radio communication.

A further embodiment of the present invention is directed to a method for reducing aviation voice communication confusion, including: receiving a first voice radio communication in a processing system; detecting whether a second voice radio communication responsive to the first voice radio communication is received by the processing system within a determined time interval; and providing an alert when the second voice radio communication responsive to the first voice radio communication is not received by the processing system within the determined time interval, wherein the processing system implements at least one of speech recognition functionality, speaker recognition functionality and radio signature functionality when detecting whether the second voice radio communication responsive to the first voice radio communication is received by the processing system within the determined time interval.

An additional embodiment of the present invention is directed to a computer-readable medium having computer-executable instructions for reducing aviation voice communication confusion, said method including: receiving a first voice radio communication in a processing system; receiving a second voice radio communication in the processing system, the second voice radio communication being responsive to the first voice radio communication; comparing the first voice radio communication to the second voice radio communication; and providing an alert when the compared first voice radio communication and second voice radio communication are at least substantially inconsistent in content, wherein the processing system implements speech recognition functionality when comparing the first voice radio communication to the second voice radio communication.

A still further embodiment of the present invention is directed to a system for reducing aviation voice communication confusion, the system including: a memory; a processor configured for being communicatively coupled to the memory, the processor being configured for receiving a first voice radio communication, the processor further being configured for receiving a second voice radio communication, the second voice radio communication being responsive to the first voice radio communication, the processor further being configured for comparing the second voice radio communication to the first voice radio communication, the first voice radio communication being stored in the memory of the system; and means for providing an alert when the compared first voice radio communication and second voice radio communication are at least substantially inconsistent in content, the alerting means configured for being communicatively coupled with the processor, wherein the system implements speech recognition functionality when comparing the second voice radio communication to the first voice radio communication.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
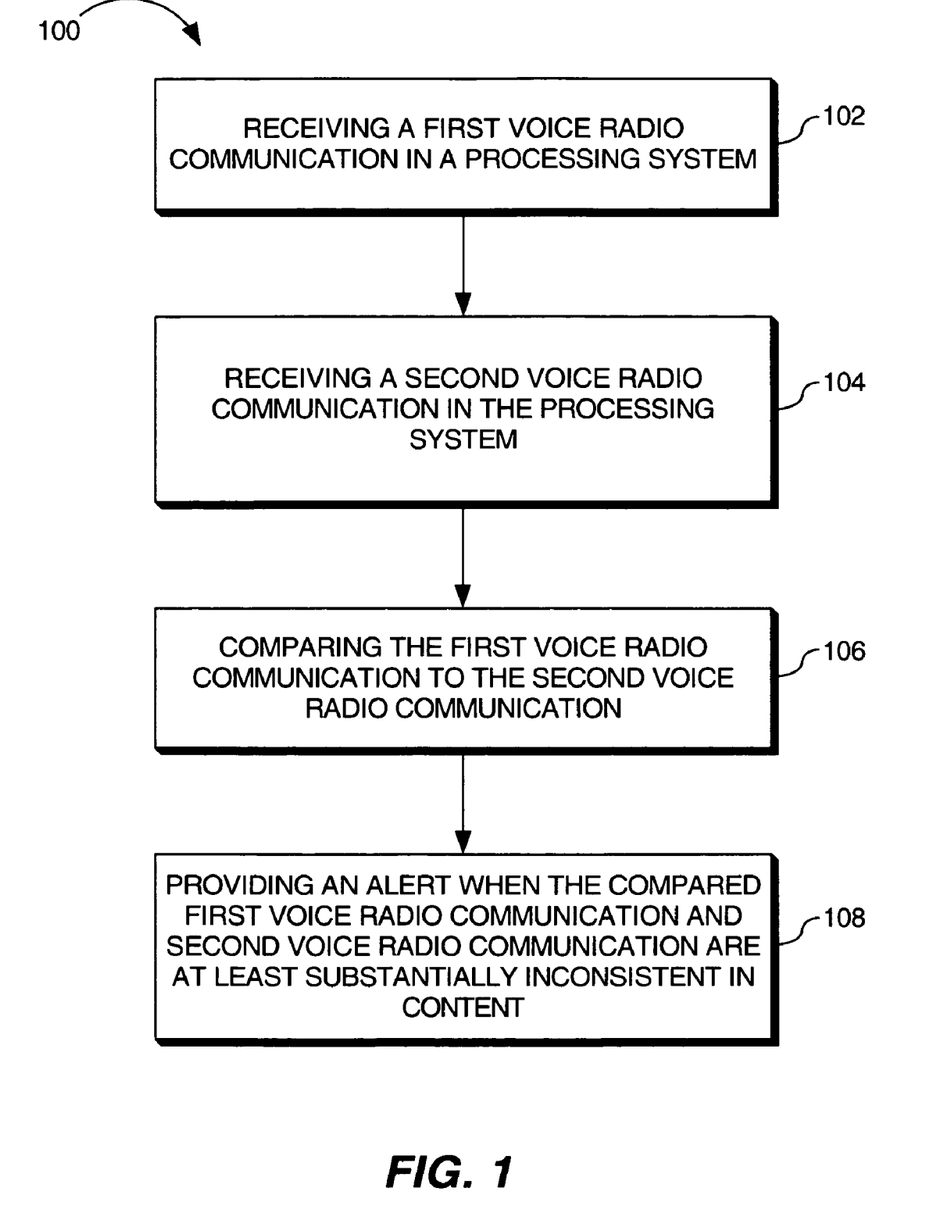
FIG. 1 is a flowchart illustrating a method for reducing aviation voice communication confusion in accordance with an exemplary embodiment of the present invention.

FIG. 1 illustrates a method for reducing aviation voice communication confusion in accordance with an exemplary embodiment of the present invention. In a present embodiment, a method 100 for reducing aviation voice communication confusion includes receiving a first voice radio communication in a processing system 102. In exemplary embodiments, the processing system 300 (FIG. 3) may be a voice communication radio product. For example, the processing system 300 may be a voice communication radio product configured for VHF (Very High Frequency, i.e., 30-300 MHz) voice communication. In further embodiments, the processing system 300 may be a voice communication radio product configured for UHF (Ultra High Frequency, i.e., 300 MHz to 3 GHz) voice communication. In additional embodiments, the processing system 300 may be a voice communication radio product configured for HF (High Frequency, i.e., 3-30 MHz) voice communication. In still further embodiments, the processing system 300 may be a voice communication radio product configured for SATCOM (Satellite Communications) voice communication. In alternative embodiments, the processing system 300 may be a display system product. For example, the display system product may be an Electronic Flight Information System (EFIS), an Engine Indication and Crew Alerting System (EICAS), or the like. In additional embodiments, the processing system 300 may be an alerting system product, such as an audio alerting system product. In an exemplary embodiment, the processing system 300 may include the audio alerting system product implemented or integrated with the display system product. In still further embodiments, the processing system 300 may be implemented as an airborne system/for airborne usage (ex—aboard an aircraft, such as a scheduled air taxi, a commuter airline, an air carrier airline, a Fixed-Based Operator (FBO), a general aviation aircraft, a non-scheduled air taxi, or the like) or as a ground system/for ground usage (ex—at an air traffic control facility). In alternative embodiments, the processing system may be a separate processor which interfaces with voice radio communication products.

In current embodiments, the method 100 further includes receiving a second voice radio communication in the processing system 104. In exemplary embodiments, the second voice radio communication is responsive to the first voice radio communication. For example, the first voice radio communication may come from/be made by an air traffic controller/air traffic control facility, which may be providing instructions to an aircraft located within that controller's/control facility's airspace, whereas the second voice radio communication may come from/be made by a pilot or other flight crew member of an aircraft, such as to acknowledge receipt of the air traffic controller's first voice radio communication. In an additional example, the first voice radio communication may be made by a pilot/flight crew member of an aircraft, while the second voice radio communication may be made from an Airline Operations Center (AOC) and may be directed to a party aboard the aircraft, such as a flight crew member and/or directed to the aircraft itself. In a further example, the first voice radio communication may be made by a Fixed Base Operator (FBO), while the second voice radio communication may be made by a pilot/flight crew member of an aircraft. In a still further example, the first voice radio communication may be made by a pilot/flight crew member of an aircraft, while the second voice radio communication may be made from a Flight Service Station (FSS). In yet a further example, the first and second voice radio communications may be made by a pilot/flight crew member of a first aircraft and a pilot/flight crew member of a second aircraft, respectively. In an additional example, a pilot/flight crew member of an aircraft may receive a voice radio communication which is an Automatic Terminal Information Service (ATIS) broadcast. In further embodiments, a responsive communication may be a communication received within a determined time interval of the first voice radio communication, a communication received from a party/entity within a determined distance of the source of the first communication, etc.

Figure 3:
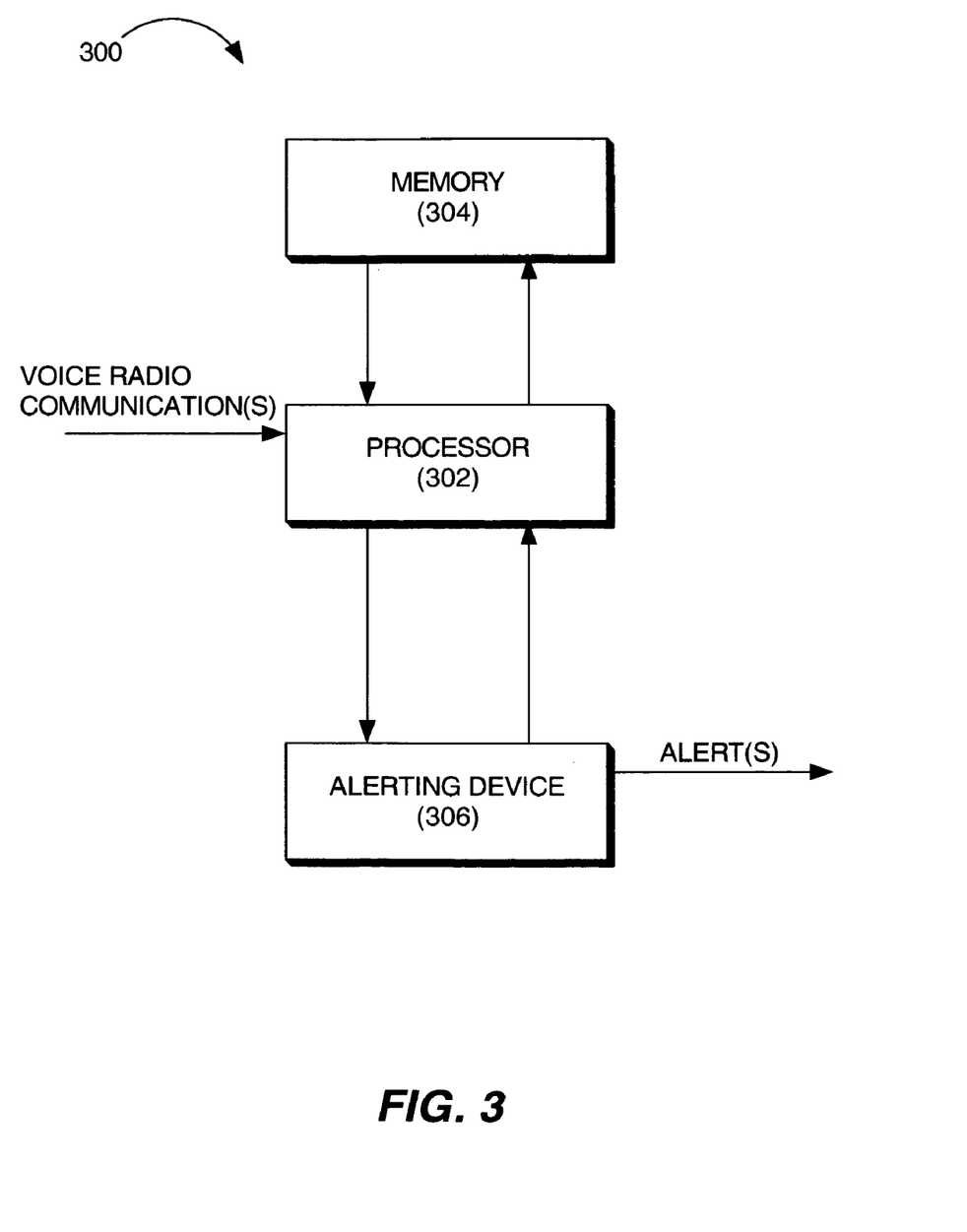
FIG. 3 is a block diagram illustrating a system for reducing aviation voice communication confusion in accordance with an exemplary embodiment of the present invention.

In further embodiments, the method 100 further includes comparing the first voice radio communication to the second voice radio communication 106. In a present embodiment, the method 100 further includes providing an alert when the compared first voice radio communication and second voice radio communication are at least substantially inconsistent in content 108. In an exemplary embodiment, the processing system 300 implements speech recognition functionality when comparing the first voice radio communication to the second voice radio communication. For example, speech recognition functionality in the present invention may include use of voice-to-text conversion, the Hidden Markov Model, algorithmic implementation/development, the dynamic programming approach, the neural network-based approach, the knowledge-based learning approach, sophisticated language parsing, or the like. Preferably, speech recognition functionality implemented in the present invention may be automatic (ex-implemented as part of an automated system).

In present embodiments, the speech recognition functionality implemented by the processing system 300 may allow the processing system to compare the received first voice radio communication and second voice radio communication and may further allow the processing system 300 to determine if the first voice radio communication and the second voice radio communication are at least substantially inconsistent in content. In an exemplary embodiment, the step of comparing the first voice radio communication and the second voice radio communication 106 may include comparing a first flight ID (such as a flight number, an aircraft tail number, a callsign, or the like) included in the first voice radio communication (which may be received by a processor 302 and placed into/stored in a memory 304 of the processing system 300, the processor 302 configured for being communicatively coupled to the memory 304, the processor 302 further being configured for comparing the second voice radio communication to the first voice radio communication) with a second flight ID included in the second voice radio communication (which may also be received by a processor 302 of the processing system 300). For example, the first voice radio communication may come from a pilot of an aircraft requesting information from an air traffic controller, the pilot identifying his aircraft as having flight ID "N50CR". The second voice radio communication may come from the air traffic controller, who provides information and acknowledges that the information is intended for an aircraft having flight ID "N50CR". Under this scenario, the speech recognition functionality of the processing system 300 may "recognize" the first voice radio communication and the second voice radio communication as being consistent in that the request was identified as coming from and the response was identified as being directed to the same flight ID.

However, if the second voice radio communication had acknowledged that its information was intended for an aircraft having flight ID "N00CR", the speech recognition functionality of the processing system 300 may recognize the first voice radio communication and the second voice radio communication as being substantially inconsistent in content, due to the first and second voice radio communications including different flight IDs. Under this scenario, (i.e., a mismatched call) an alert may be provided to a user of the processing system 300. For instance, if the processing system 300 is implemented on the aircraft, an alert may be provided via an alerting device 306, such as a visual alert (ex—a textual message or indicator light provided via a display, such as a graphical user interface (GUI), of the system 300), an audible alert (ex—synthesized voice instructions emitted via a speaker integrated as part of the alerting device 306, the alerting device configured for being communicatively coupled with the processor), or the like. The alert may allow the pilot to quickly become aware that the communications were at least substantially inconsistent, so that the pilot may take further measures, such as repeating his request, asking for clarification, etc., in order to clarify whether the mismatched flight IDs were merely the result of a communication error or whether the air traffic controller's communication was truly intended for a different aircraft located in the same airspace having flight ID "N00CR", thereby promoting reduction of the possibility of: confusion, loss of separation between aircraft, accidents, or the like.

In a further example/scenario, the processing system 300 may be implemented as a ground usage system at an air traffic control facility. The first voice radio communication may come from an air traffic controller/air traffic control facility, and may make a request of or provide information (ex—such as a clearance) to a pilot/flight crew member of an aircraft located within the air traffic controller's airspace. For example, the controller may provide a message such as: "N50CR, cleared to land, runway 31." The second voice radio communication may come from a pilot/flight crew member of an aircraft who acknowledges the instruction (ex—the clearance) with the following return message: "Cedar Rapids Tower, N50CR, cleared to land, runway 13." In this scenario (i.e., improper readback scenario), the speech recognition functionality of the processing system 300 may "recognize" the first voice radio communication and the second voice radio communication as being substantially inconsistent in content because the runway numbers spoken in the first and second voice radio communications are different numbers. Under this scenario, an alert may be provided to the user of the processing system 300, (ex—the air traffic controller located at the air traffic facility) that a miscommunication between the controller and pilot has occurred. In this example, the air traffic controller, after being provided the alert, may then be able to take measures to clarify the miscommunication, such as repeating his instruction and ensuring that a correct acknowledgment is received.

In additional embodiments, the speech recognition functionality of the processing system 300 may be configured for recognizing various inconsistencies in syntax/content (beyond just flight IDs, mismatched runway numbers, etc.) of exchanged voice radio communications which may be considered as rendering the exchanged communications at least substantially inconsistent. For instance, the speech recognition functionality of the processing system 300 may be configured to compare the exchanged voice radio communications to determine if they generally "make sense", and if it's determined that they do not (i.e., that the communications are at least substantially inconsistent), an alert may be provided. In a present embodiment, the speech recognition functionality of the processing system 300, when the processing system 300 is implemented as an airborne system, may utilize various sources of information when comparing voice radio communications (i.e., carrying out its consistency check) to determine if the exchanged voice radio communications are at least substantially inconsistent. In such embodiments, connection of the processing system 300 to other data buses and/or expansion of processing capabilities may be required. The following examples are all information source comparisons which may be carried out by the processing system 300 of the present invention to determine if the syntax/content of exchanged voice radio communications (such as between aircraft pilot and air traffic controller) make sense or if they are at least substantially inconsistent: aircraft state information (ex—the aircraft's current heading, altitude and speed) may be compared with a voice radio communication including clearance information (such as permission to land, takeoff as provided by an air traffic controller); mode control panel settings or autopilot settings may be compared with a voice radio communication including clearance information; ATIS altimeter information or setting(s) (which may include an altimeter setting to adjust for current barometric pressure) may be compared to pilot/crew-selected altimeter setting(s); air traffic controller-relayed altimeter setting information may be compared to pilot/crew-selected altimeter setting(s); traffic displays (ex—air traffic displays) may be compared with traffic callouts to help flight crews identify other traffic; and ATIS active runway information may be compared with the runway that is being used.

Alternatively, when the processing system 300 is implemented as a ground system, other sources of information may be compared, such as: after an instruction has been issued, (ex—by an air traffic controller) comparing radar/ADS-B (Automatic Dependent Surveillance Broadcast) data to see if the instruction was followed by the correct aircraft, as opposed to being followed by an incorrect aircraft; and comparing voice radio communication content w/air traffic situation to see that the message and syntax are reasonable. In such embodiments, connection of the processing system 300 to other data buses and/or expansion of processing capabilities may be required.

Figure 2:
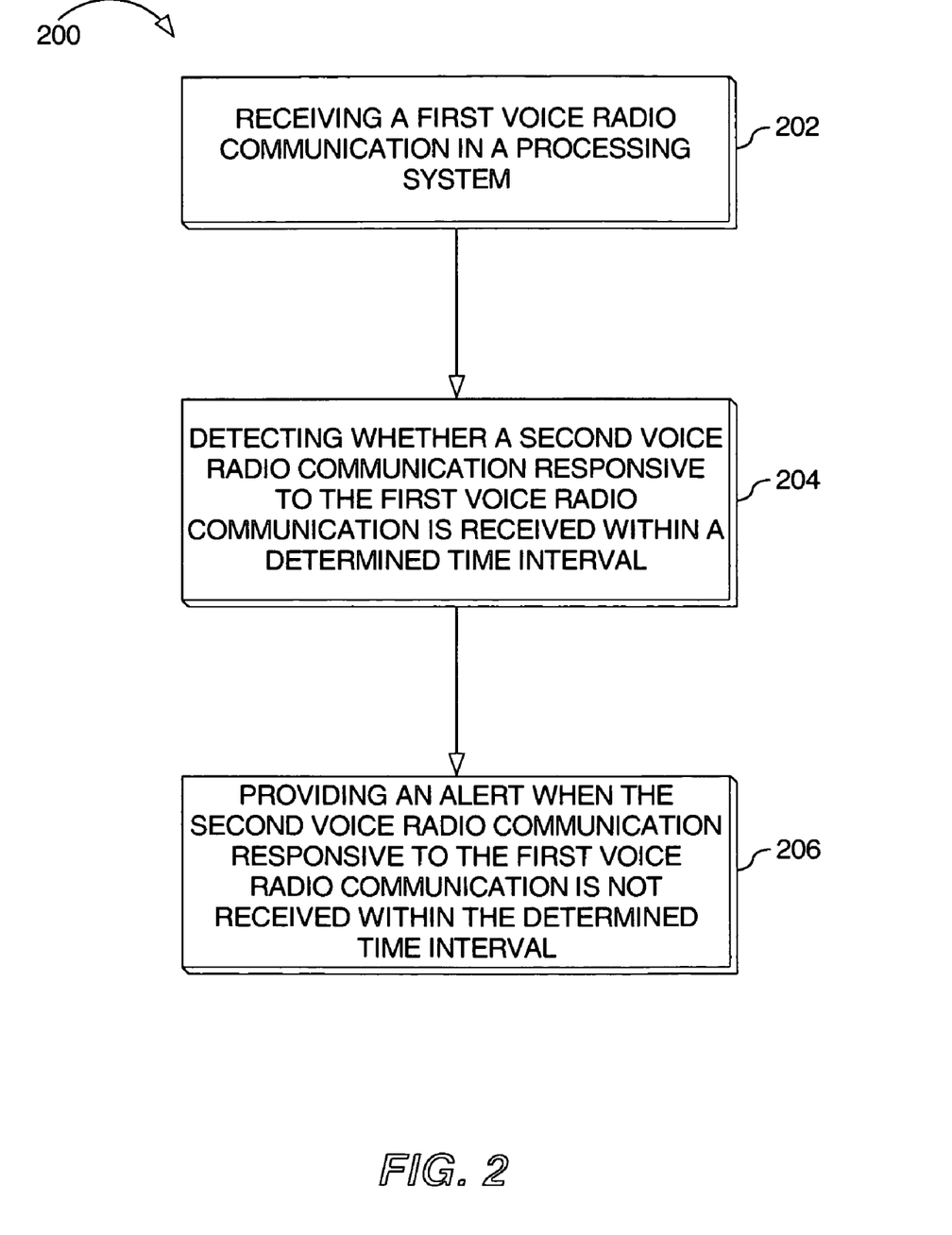
FIG. 2 is a flowchart illustrating a method for reducing aviation voice communication confusion in accordance with an alternative exemplary embodiment of the present invention.

FIG. 2 illustrates a method for reducing aviation voice communication confusion in accordance with an alternative exemplary embodiment of the present invention. In an exemplary embodiment, a method 200 for reducing aviation voice communication confusion includes receiving a first voice radio communication in a processing system 202. For example, the first voice radio communication may be received by the processing system 300, which may be implemented on an aircraft. The first voice radio communication may include a clearance or other instruction from an air traffic controller directed to the processing system-implementing aircraft. In further embodiments, the method 200 further includes detecting whether a second voice radio communication responsive to the first voice radio communication is received by the processing system within a determined time interval 204. For instance, the processing system 300 may implement speech recognition functionality for detecting whether a second voice radio communication responsive to the air traffic controller's instructions (ex—an acknowledgement of the controller's instructions from the system-implementing aircraft) is received by the processing system 300 within a certain time interval (ex-30 seconds, 1 minute, etc.—may be established by a user of the processing system or may be pre-set). In additional embodiments, the method 200 further includes providing an alert when the second voice radio communication responsive to the first voice radio communication is not received by the processing system 300 within the determined time interval 206. For example, if a second voice radio communication responsive to the air traffic controller's instructions (ex—the acknowledgement of the controller's instructions by the system-implementing aircraft) is not received by the processing system 300 within the determined time interval (ex-30 seconds, 1 minute, etc.), the processing system 300 aboard the aircraft may provide an alert to the pilot so that the pilot may be aware that he/she has missed or failed to acknowledge a voice radio communication message addressed to his/her aircraft.

In further embodiments, the processing system 300 may be a surveillance receiver/processor product configurable for airborne implementation (ex—aboard an aircraft) or ground implementation (ex—at an air traffic control facility) such as: a Traffic Alert & Collision Avoidance System (TCAS); a Traffic Alert & Collision Avoidance System (TCAS) with Automatic Dependent Surveillance Broadcast (ADS-B) functionality (i.e., a Traffic Computer); a Configurable Integrated Surveillance System (CISS); an Integrated Surveillance System (ISS); or a Traffic Surveillance System (TSS). In still further embodiments, the processing system 300 may be configured with at least one of ADS-B and Traffic Information Service Broadcast (TIS-B) receiving functionality. In additional embodiments, a display system product may further include: a Cockpit Display of Traffic Information (CDTI) display, an Integrated Multi-Function Display (iMFD), an Engine Indication and Crew Alerting System (EICAS) display, or an Electronic Flight Bag (EFB) display.

Figure 4:
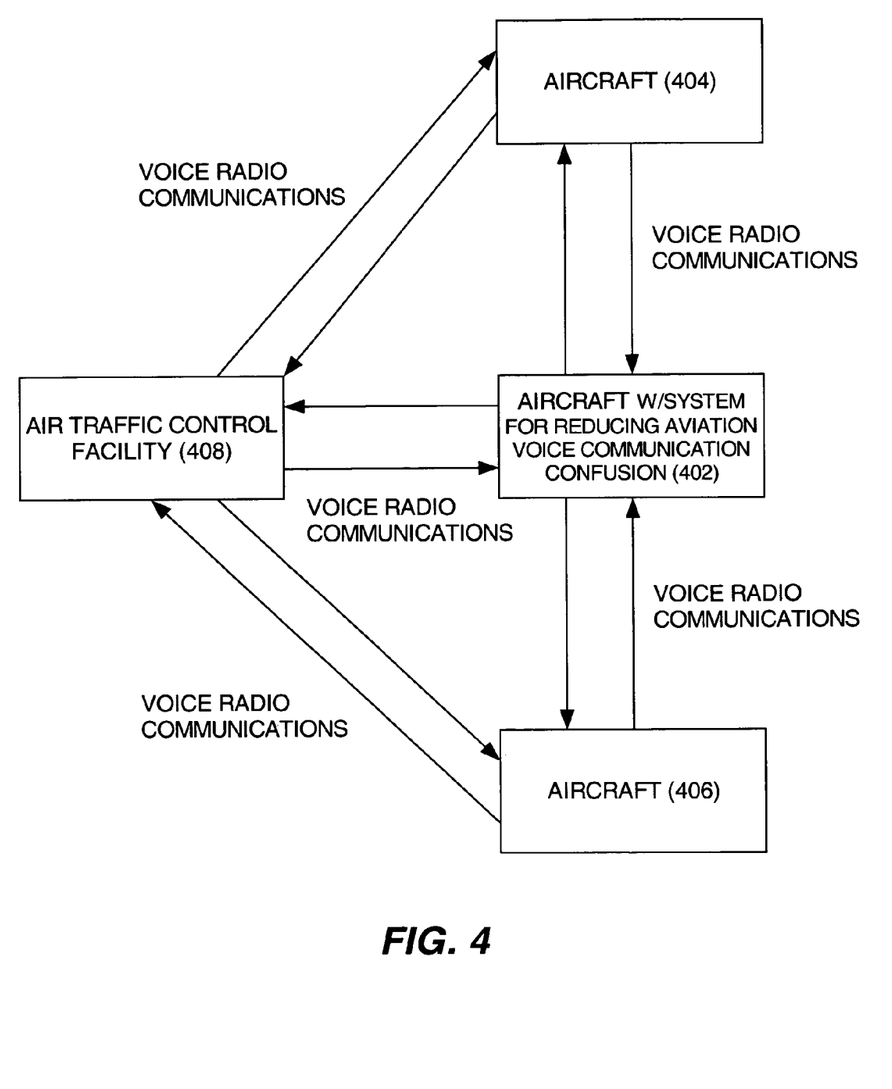
FIG. 4 is an exemplary block diagram communications schematic including an aircraft implementing a system for reducing aviation voice communication confusion in accordance with an exemplary embodiment of the present invention.

FIG. 4 illustrates an exemplary block diagram communications schematic including an aircraft 402 implementing the processing system 300 of the present invention. For instance, the processing system 300 of the system-implementing aircraft 402 may receive a first voice radio communication from a flight crew member aboard one of a plurality of additional aircraft 404, 406 located within substantially proximal airspace, or from an air traffic controller located at an air traffic control facility 408 for the airspace occupied by the plurality of aircraft 402, 404, 406. As discussed above, the processing system 300 may further receive a second voice radio communication responsive to the first voice radio communication. For example, the second voice radio communication may be from a pilot of the system-implementing aircraft 402 verifying instructions received from an air traffic controller (via the first voice radio communication). The processing system 300 of the system-implementing aircraft 402 may then compare the two received voice radio communications, and if the compared voice radio communications are at least substantially inconsistent in content, an alert may be provided to the pilot of the system-implementing aircraft 402. The pilot of the system-implementing aircraft 402 may then have the opportunity to re-verify the instructions received from the air traffic controller at the air traffic control facility 408 to clarify potential communication confusion between the pilot and the air traffic controller. Again, it is contemplated that the processing system 300 of the present invention may also be implemented aboard each of the one or more aircraft (402, 404, 406) and/or at the air traffic control facility 408.

In further embodiments, the processing system 300 may implement speaker and/or radio signature recognition functionality for detecting whether a second voice radio communication responsive to the first communication is received by the processing system 300. The speaker recognition functionality may allow the processing system 300 to identify or match the voice of a specific speaker, such as a pilot, and/or one or more flight crew members, with a particular aircraft. For instance, a series of voice radio communications may be exchanged between a pilot/flight crew member of an aircraft and an air traffic controller, each of the exchanges including full flight ID information, when, at some point, a voice radio communication, which is otherwise generally consistent in content with the previous message, may be sent by the pilot or one of the flight crew members of the aircraft to the controller, the message including an abbreviated version of the flight ID (ex-callsign). In the exemplary embodiment, the speaker recognition functionality may allow the processing system 300 to associate the speaker who communicated the voice radio communication which included the abbreviated callsign with the aircraft identified in the previous series of messages (i.e., the messages in which the full flight ID of the aircraft was provided), thereby allowing the processing system 300 to prevent an unnecessary alert from being provided. Radio signature recognition functionality would work in a similar manner, except that it would allow the processing system 300 to utilize uniqueness of/among radio equipment as a criteria for identifying the source of the voice radio communication in which the abbreviated callsign was used and would further allow the processing system 300 to associate the source radio of the voice radio communication including the abbreviated callsign with a radio which is aboard the aircraft identified in the previous series of messages (i.e., the messages in which the full flight ID of the aircraft was provided), thereby allowing the processing system 300 to prevent an unnecessary alert from being provided.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
    receiving a first voice radio communication in a processing system;
    detecting whether a second voice radio communication responsive to the first voice radio communication is received by the processing system within a pre-determined time interval;
    when the second voice radio communication responsive to the first voice radio communication is not received by the processing system within the pre-determined time interval, providing a timing alert;
    when the second voice radio communication responsive to the first radio communication is received by the processing system, comparing the first voice radio communication to the second voice radio communication; and
    providing an inconsistency alert when the compared first voice radio communication and second voice radio communication are at least substantially inconsistent in content, wherein the processing system implements speech recognition functionality when comparing the first voice radio communication to the second voice radio communication, wherein the processing system implements at least one of speech recognition functionality, speaker recognition functionality and radio signature functionality when detecting whether the second voice radio communication responsive to the first voice radio communication is received by the processing system within the pre-determined time interval.

2. A method as claimed in claim 1, wherein the step of comparing the first voice radio communication to the second voice radio communication includes:
    comparing a first flight ID included in the first voice radio communication with a second flight ID included in the second voice radio communication.

3. A method as claimed in claim 1, further comprising:
    comparing at least one of the first voice radio communication and the second voice radio communication to aircraft state information.

4. A method as claimed in claim 1, further comprising:
    comparing at least one of the first voice radio communication and the second voice radio communication to at least one of mode control panel settings and autopilot settings.

5. A method as claimed in claim 1, further comprising:
    comparing at least one of the first voice radio communication and the second voice radio communication to air traffic display information.

6. A method as claimed in claim 1, further comprising:
    comparing at least one of the first voice radio communication and the second voice radio communication to Automatic Terminal Information Service (ATIS) active runway information.

7. A method as claimed in claim 1, further comprising:
    comparing at least one of the first voice radio communication and the second voice radio communication to at least one of radar data and Automatic Dependent Surveillance Broadcast (ADS-B) data.

8. A method as claimed in claim 1, wherein the processing system is a voice communication radio product, the voice communication radio product being configured for at least one of Very High Frequency (VHF) voice communication, Ultra High Frequency (UHF) voice communication, High Frequency (HF) voice communication, and Satellite Communications (SATCOM) voice communication.

9. A method as claimed in claim 1, wherein the processing system is an alerting system product.

10. A method as claimed in claim 9, wherein the alerting system product is a display system product, the display system product being at least one of an Electronic Flight Information System (EFIS) and an Engine Indication and Crew Alerting System (EICAS).

11. A method for reducing aviation voice communication confusion, comprising:
    receiving a first voice radio communication in a processing system;
    detecting whether a second voice radio communication responsive to the first voice radio communication is received by the processing system within a pre-determined time interval; and
    providing an alert when the second voice radio communication responsive to the first voice radio communication is not received by the processing system within the pre-determined time interval,
    wherein the processing system implements at least one of speech recognition functionality, speaker recognition functionality and radio signature functionality when detecting whether the second voice radio communication responsive to the first voice radio communication is received by the processing system within the pre-determined time interval.

12. A non-transitory computer-readable medium having computer-executable instructions for reducing aviation voice communication confusion, said method comprising:
    receiving a first voice radio communication in a processing system;
    detecting whether a second voice radio communication responsive to the first voice radio communication is received by the processing system within a pre-determined time interval;
    when the second voice radio communication responsive to the first voice radio communication is not received by the processing system within the pre-determined time interval, providing a timing alert;
    when the second voice radio communication responsive to the first radio communication is received by the processing system, comparing the first voice radio communication to the second voice radio communication; and providing an inconsistency alert when the compared first voice radio communication and second voice radio communication are at least substantially inconsistent in content, wherein the processing system implements speech recognition functionality when comparing the first voice radio communication to the second voice radio communication, wherein the processing system implements at least one of speech recognition functionality, speaker recognition functionality and radio signature functionality when detecting whether the second voice radio communication responsive to the first voice radio communication is received by the processing system within the pre-determined time interval.

13. A computer-readable medium having computer-executable instructions for performing a method for reducing aviation voice communication confusion as claimed in claim 12, wherein the step of comparing the first voice radio communication to the second voice radio communication includes:

comparing a first flight ID included in the first voice radio communication with a second flight ID included in the second voice radio communication.

14. A computer-readable medium having computer-executable instructions for performing a method for reducing aviation voice communication confusion as claimed in claim 12, said method further comprising:

comparing at least one of the first voice radio communication and the second voice radio communication to aircraft state information.

15. A computer-readable medium having computer-executable instructions for performing a method for reducing aviation voice communication confusion as claimed in claim 12, said method further comprising:

comparing at least one of the first voice radio communication and the second voice radio communication to at least one of mode control panel settings and autopilot settings.

16. A computer-readable medium having computer-executable instructions for performing a method for reducing aviation voice communication confusion as claimed in claim 12, said method further comprising:

comparing at least one of the first voice radio communication and the second voice radio communication to air traffic display information.

17. A computer-readable medium having computer-executable instructions for performing a method for reducing aviation voice communication confusion as claimed in claim 12, said method further comprising:

comparing at least one of the first voice radio communication and the second voice radio communication to Automatic Terminal Information Service (ATIS) active runway information.

18. A computer-readable medium having computer-executable instructions for performing a method for reducing aviation voice communication confusion as claimed in claim 12, said method further comprising:

comparing at least one of the first voice radio communication and the second voice radio communication to at least one of radar data and Automatic Dependent Surveillance Broadcast (ADS-B) data.

19. A computer-readable medium having computer-executable instructions for performing a method for reducing aviation voice communication confusion as claimed in claim 12, wherein the processing system is at least one of a voice communication radio product, an alerting system product and a display system product.

20. A system for reducing aviation voice communication confusion, comprising:

a memory;

a processor configured for being communicatively coupled to the memory, the processor being configured for receiving a first voice radio communication, the processor further being configured for receiving a second voice radio communication, the second voice radio communication being responsive to the first voice radio communication, the processor further being configured for comparing the second voice radio communication to the first voice radio communication, the first voice radio communication being stored in the memory of the system, the processor further being configured for determining when the second voice radio communication responsive to the first voice radio communication is not received within a pre-determined time interval;

means for providing an inconsistency alert when the compared first voice radio communication and second voice radio communication are at least substantially inconsistent in content, the alerting means configured for being communicatively coupled with the processor;

means for providing a timing alert when the processor determines that the second voice radio communication responsive to the first voice radio communication is not received with the pre-determined time interval;

wherein the system implements speech recognition functionality when comparing the second voice radio communication to the first voice radio communication.

* * * * *